(12) United States Patent
Braun et al.

(10) Patent No.: US 9,238,767 B2
(45) Date of Patent: Jan. 19, 2016

(54) HYBRID ADHESIVE AND THE USE THEREOF IN ENGINEERED WOOD BOARDS

(75) Inventors: Roger Braun, Willisau (CH); Andreas Gier, Saarbruecken (DE); Joachim Hasch, Berlin (DE)

(73) Assignee: Kronotec AG, Lucerne (CH)

( * ) Notice: Subject to any disclaimer, the term of this patent is extended or adjusted under 35 U.S.C. 154(b) by 0 days.

(21) Appl. No.: 13/881,532

(22) PCT Filed: Oct. 21, 2011

(86) PCT No.: PCT/EP2011/068481
§ 371 (c)(1),
(2), (4) Date: Jul. 22, 2013

(87) PCT Pub. No.: WO2012/055791
PCT Pub. Date: May 3, 2012

(65) Prior Publication Data
US 2013/0331484 A1    Dec. 12, 2013

(30) Foreign Application Priority Data

Oct. 27, 2010   (EP) ..................... 10189048

(51) Int. Cl.

| | | |
|---|---|---|
| *C08K 9/06* | (2006.01) | |
| *C09J 179/04* | (2006.01) | |
| *C08G 18/00* | (2006.01) | |
| *C08G 18/71* | (2006.01) | |
| *C08G 18/83* | (2006.01) | |
| *C09J 161/00* | (2006.01) | |
| *C09J 161/28* | (2006.01) | |
| *C09J 175/04* | (2006.01) | |
| *C09J 183/04* | (2006.01) | |
| *C09J 183/06* | (2006.01) | |
| *C09J 183/08* | (2006.01) | |
| *B29D 7/01* | (2006.01) | |
| *C09J 163/00* | (2006.01) | |
| *C09J 177/00* | (2006.01) | |
| *C09J 177/06* | (2006.01) | |
| *C09J 167/00* | (2006.01) | |
| *C09J 167/02* | (2006.01) | |
| *C08K 3/22* | (2006.01) | |
| *C08K 3/36* | (2006.01) | |

(52) U.S. Cl.
CPC .............. *C09J 179/04* (2013.01); *B29D 7/01* (2013.01); *C08G 18/003* (2013.01); *C08G 18/718* (2013.01); *C08G 18/837* (2013.01); *C09J 161/00* (2013.01); *C09J 161/28* (2013.01); *C09J 175/04* (2013.01); *C09J 183/04* (2013.01); *C09J 183/06* (2013.01); *C09J 183/08* (2013.01); *C08K 3/22* (2013.01); *C08K 3/2279* (2013.01); *C08K 3/36* (2013.01); *C08K 9/06* (2013.01); *C08K 2201/005* (2013.01); *C09J 163/00* (2013.01); *C09J 167/00* (2013.01); *C09J 167/02* (2013.01); *C09J 177/00* (2013.01); *C09J 177/06* (2013.01)

(58) Field of Classification Search
CPC ...... C09J 163/00; C09J 177/00; C09J 177/06; C09J 161/00; C09J 161/28; C09J 161/06; C09J 183/04; C09J 175/04; C09J 167/00; C09J 167/02; C09J 9/06
USPC .................................................. 523/212, 213
See application file for complete search history.

(56) References Cited

U.S. PATENT DOCUMENTS

| | | | | |
|---|---|---|---|---|
| 4,151,154 | A * | 4/1979 | Berger ........................ | 523/203 |
| 4,613,527 | A * | 9/1986 | Potter et al. ................. | 427/412 |
| 5,256,706 | A * | 10/1993 | Carpenter et al. ........... | 523/213 |
| 6,465,104 | B1 | 10/2002 | Krebs et al. | |
| 7,279,223 | B2 * | 10/2007 | Rubinsztajn et al. ........ | 428/414 |
| 2008/0075925 | A1 * | 3/2008 | Jones et al. .................. | 428/167 |
| 2009/0076198 | A1 * | 3/2009 | Giesenberg et al. ......... | 524/82 |
| 2009/0292097 | A1 * | 11/2009 | Scholz et al. ................ | 528/38 |
| 2010/0137485 | A1 * | 6/2010 | Scholz et al. ................ | 524/261 |
| 2013/0245173 | A1 * | 9/2013 | Welker et al. ............... | 524/263 |

FOREIGN PATENT DOCUMENTS

| | | |
|---|---|---|
| JP | 2009167056 A | 7/2009 |
| JP | 2010188600 A | 9/2010 |

\* cited by examiner

*Primary Examiner* — Margaret Moore
(74) *Attorney, Agent, or Firm* — The Webb Law Firm

(57) ABSTRACT

The present invention relates to a hybrid adhesive, in particular for use in the production of engineered wood such as particle boards, fiber boards, plywood or glued-laminated timber, comprising at least one polycondensation adhesive, at least one polyaddition adhesive, and at least one particular, in particular a nanoparticle smaller than 500 nm, wherein the at least one particle is modified with at least one compound of the general Formula (I) $R_a SiX_{(4-a)}$, or the general Formula (II) $O_b X_c (OH)_d R_e SiO_{(4-b-c-d-e)/2}$. The present invention also relates to the use of the adhesive in engineered wood boards and to methods for the production thereof.

15 Claims, 1 Drawing Sheet

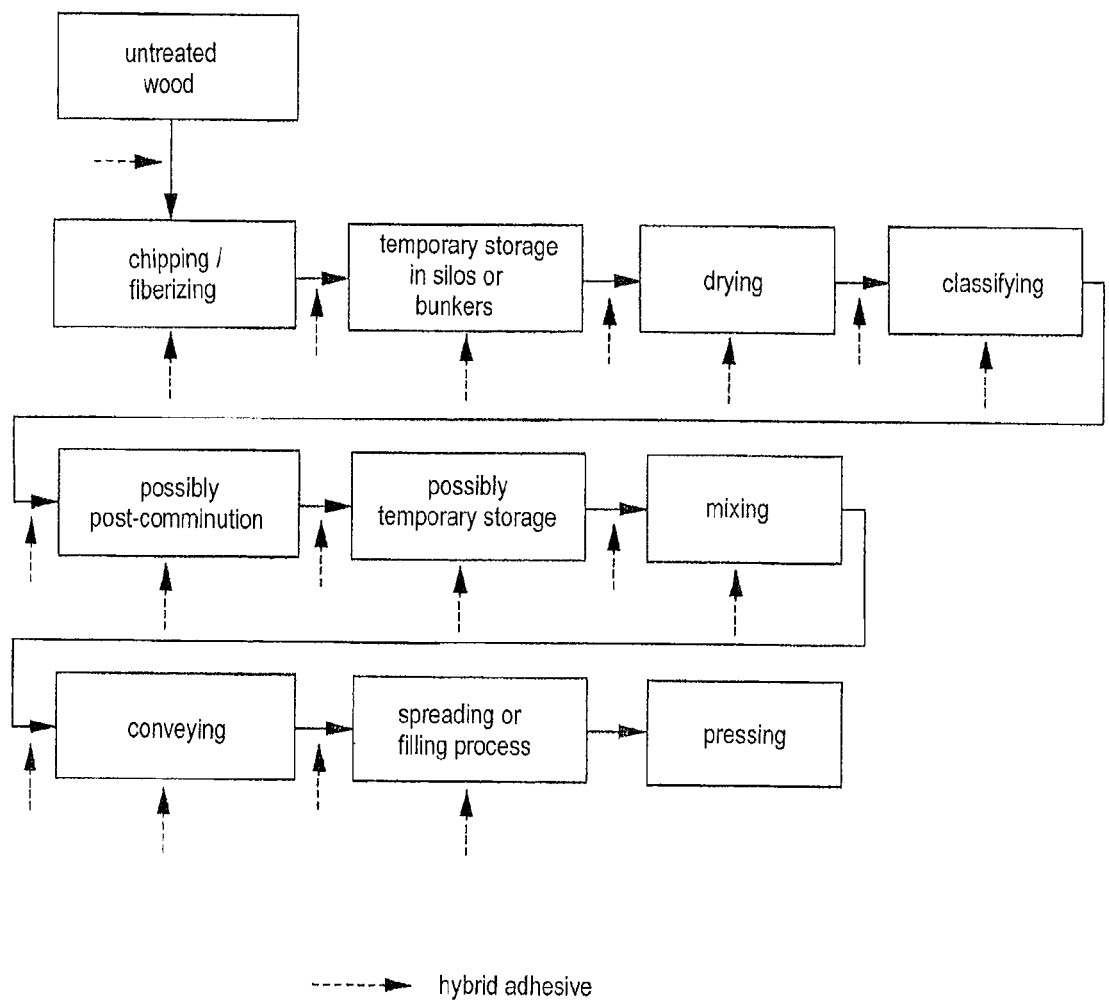

HYBRID ADHESIVE AND THE USE THEREOF IN ENGINEERED WOOD BOARDS

CROSS-REFERENCE TO RELATED APPLICATIONS

This application is a National Phase Patent Application of International Patent Application Number PCT/EP2011/068481, filed Oct. 21, 2011, which claims priority of European Patent Application No. 10189048.1, filed Oct. 27, 2010, the disclosure of which are incorporated herein in their entireties by reference.

BACKGROUND

The present invention relates to an adhesive, the use thereof, a method for producing the same, an engineered wood board, and a method for producing the engineered wood board.

Adhesive are a decisive constituent in the industrial production of a multitude of products, for example in the production of wood-based materials. Adhesives can be classified according to different criteria based on the chemical basis of the adhesives or their setting mechanism. Proceeding from the production method of the adhesives, a total of three superordinate classes of adhesives are defined: Polymerization adhesives, polyaddition adhesives, and polycondensation adhesives. Further divisions of the adhesives with respect to their physical and/or chemical properties, such as e.g. hotmelt adhesives or solvent adhesives, also are possible.

The polymerization adhesives are produced by reaction of monomers including a carbon-carbon double bond after activation. The activation of the starting materials can be effected by suitable catalysts or radicals and/or in the presence of radiation, for example UV radiation or electron beam. Typical polymerization adhesives are to be assigned e.g. to the group of acrylate adhesives.

A polycondensation adhesive, on the other hand, can be obtained by reaction of two monomer molecules by splitting off a simple molecule, such as water, acid or alcohol. The polymeric reaction product thus is present together with a by-product obtained during the reaction, so that corresponding measures are required during the processing of these adhesives. The most important polycondensates for use as adhesives include polyamides, polyesters and silicones or formaldehyde condensates, wherein reference should be made here in particular to the phenol-formaldehyde adhesives (PF), cresol/resorcinol-formaldehyde adhesives, urea-formaldehyde-resin adhesives (UF) or melamine-formaldehyde adhesives (MF).

The production of the polyaddition adhesive is based on the addition of various reactive monomer molecules by simultaneous migration of a hydrogen atom from the one component to the other component. Typical representatives include epoxy resin adhesives, polyurethanes or polycyanurates.

For the production of wood-based materials such as engineered wood boards, wood chipping products are coated with the adhesive and compressed to molded articles by applying pressure and temperature.

The type of adhesive used is substantially influenced by the size and quality of the wood fibers and/or wood chips used.

For example in the production of wood particle boards and wood fiber boards, such as e.g. MDF and HDF boards, which are produced from wood fibers in a dry process, there are frequently used polycondensation adhesives, in particular in the form of urea-formaldehyde resins. The particular advantage in the use of formaldehyde resins as adhesives consists in their high availability, the low costs as well as an easy manufacturability and handleability. Since the formaldehyde resins usually are produced by reaction with an excess of formaldehyde, these excesses of formaldehyde also are detectable in the intermediate and/or end products. Since formaldehyde, however, is classified as carcinogenic, the use of formaldehyde resins thus turns out to be disadvantageous in particular for the production of engineered wood boards for use indoors. In addition, the resins condensed-out have a low water stability.

In the production of boards from oriented wood chips, so-called OSB boards, on the other hand, polyaddition adhesives containing urethanes, e.g. on the basis of diphenyl methane diisocyanate adhesives, are used more and more. The complete chemical reaction without disturbing excesses and the high adhesive force are regarded as particular advantages of polyurethane adhesives. What is regarded as particularly disadvantageous, on the other hand, is the limited availability at a high price and the affinity to metal, so that metallic tools and plant sections must particularly be protected against direct contact. It is also disadvantageous that e.g. PMDI reacts already with the water from the room air humidity.

It is known that with a joint use of polycondensation adhesives and polyaddition adhesives incompatibilities will occur between the two adhesive systems, which will lead to comparatively poor technological properties. This problem is particularly pronounced at the interfaces of layers with different glue systems.

SUMMARY

It thus is the object underlying the present invention to provide an adhesive system which does not have these disadvantages, since the positive properties of the two glue systems could be combined thereby. Therefore, there has long since been a great demand of hybrid adhesives, in order to combine advantages and largely exclude disadvantages.

The hybrid adhesive according to the invention, in particular for use in the production of wood-based materials, accordingly comprises

- at least one polycondensation adhesive,
- at least one polyaddition adhesive, and
- at least one particle, in particular a nanoparticle smaller than 500 nm, wherein the at least one particle is modified with at least one compound of the general Formula (I)

$$R_a SiX_{(4-a)} \quad (I),$$

or the general Formula (II)

$$O_b X_c (OH)_d R_e SiO_{(4-b-c-d-e)/2} \quad (II)$$

wherein

X is H, OH or a hydrolyzable radical selected from the group comprising halogen, alkoxy, carboxy, amino, monoalkylamino or dialkylamino, aryloxy, acyloxy, alkyl carbonyl, R is a non-hydrolyzable organic radical R selected from the group comprising substituted and non-substituted alkyl, substituted and non-substituted aryl, substituted and non-substituted alkenyl, substituted and non-substituted alkynyl, substituted and non-substituted cycloalkyl, which can be interrupted by —O— or —NH—, and wherein R includes at least one functional group Q which is selected from a group including an epoxy, hydroxy, ether, amino, monoalkylamino, dialkylamino, substituted and non-substituted anilino, amide, carboxy, alkynyl, acrylic, acryloxy, methacrylic, methacryloxy, mercapto, cyano, alkoxy, isocyanato, aldehyde, alkylcarbonyl, acid anhydride and/or phosphoric acid group, R and X each can be the same or different from each other, and a=1, 2, 3, in particular 1, b, c, d=0 or 1, and e=1, 2, 3.

In the sense of the present application it is apparent for a skilled person that the silane-containing compounds with the general Formula (II) are derived directly as hydrolysis and/or condensation products from the silane compounds of the general Formula (I). The hydrolysis and/or condensation of the compounds of the general Formula (I) is caused and influenced by the reaction conditions, in particular by acidic reaction conditions, during the production of the adhesive.

As hybrid adhesive in the sense of the present invention an adhesive is meant which comprises at least two different types of adhesive.

The hybrid adhesive according to the invention has an excellent handleability and adhesive force with good availability. In addition, the adhesive according to the invention accounts for the increased requirements as to an energy-efficient production and use, ecology and compatibility.

The combination of the two systems of polycondensation adhesive and polyaddition adhesive in the hybrid adhesive according to the invention is effected by chemical coupling via the modified particles. The modified particles on the one hand have at least one functional group for the chemical bonding of polycondensation adhesives, for example of formaldehyde resins, and on the other hand at least one functional group for the chemical bonding of polyaddition adhesives, such as for example a polyurethane.

The modified particles thus represent a mediator substance between a polyaddition matrix, e.g. in the form of a urethane matrix, and a polycondensate, e.g. in the form of a urea-formaldehyde resin.

In a preferred embodiment, the particles are modified or mixed with at least two different compounds of the general Formula (I) and/or (II).

The radical X advantageously is selected from a group including fluorine, chlorine, bromine, iodine, $C_{1-6}$ alkoxy, in particular methoxy, ethoxy, n-propoxy and butoxy, $C_{6-10}$ aryloxy, in particular phenoxy, $C_{2-7}$ acyloxy, in particular acetoxy or propionoxy, $C_{2-7}$ alkylcarbonyl, in particular acetyl, monoalkylamino or dialkylamino with $C_1$ to $C_{12}$, in particular $C_1$ to $C_6$. Particularly preferred hydrolyzable groups include $C_{1-4}$ alkoxy groups, in particular methoxy and ethoxy.

The non-hydrolyzable R preferably is selected from a group comprising substituted and non-substituted $C_1$-$C_{30}$ alkyl, in particular $C_5$-$C_{25}$ alkyl, substituted and non-substituted $C_2$-$C_6$ alkenyl, substituted and non-substituted $C_2$-$C_6$ alkynyl, and substituted and non-substituted $C_6$-$C_{10}$ aryl.

In one embodiment, the non-hydrolyzable radical R is selected from the group including methyl, ethyl, n-propyl, isopropyl, n-butyl, s-butyl, t-butyl, pentyl, hexyl, cyclohexyl, vinyl, 1-propenyl, 2-propenyl, butenyl, acetylenyl, propargyl, phenyl and naphthyl.

In accordance with the present application, the term "non-hydrolyzable organic radical" is understood to be an organic radical which in the presence of water does not lead to the formation of an OH group or $NH_2$ group linked with the Si atom.

The at least one functional group Q, which is contained in the organic non-hydrolyzable radical R, advantageously comprises an epoxy group, in particular a glycidyl or glycidyloxy group, an amine or an isocyano group.

The functional groups via which cross-linking is possible in particular comprise polymerizable and/or polycondensable groups, wherein the polymerization reaction also is meant to include polyaddition reactions. The functional groups preferably are selected such that via possibly catalyzed polymerization and/or condensation reactions an organic cross-linkage can be carried out between the various adhesive systems. A first functional group of the silane is bound to the surface of the nanoparticles. A second functional group of the silane, in particular in the form of an OH group, each binds to the matrix of the polyaddition and/or polycondensation adhesive.

In a particularly preferred embodiment, gamma-isocyanatopropyltriethoxysilane or a glycidyloxypropyltriethoxysilane are used as silanes.

As described, the non-hydrolyzable radical R necessarily has at least one functional group Q. In addition, the radical R also can be present in substituted form with further radicals.

The term "substituted", in use with "alkyl", "alkenyl", "aryl", etc. designates the substitution of one or more atoms, in general H atoms, by one or more of the following substituents, preferably by one or two of the following substituents: halogen, hydroxy, protected hydroxy, oxo, protected oxo, $C_3$-$C_7$ cycloalkyl, bicyclic alkyl, phenyl, naphthyl, amino, protected amino, monosubstituted amino, protected monosubstituted amino, disubstituted amino, guanidino, protected guanidino, a heterocyclic ring, a substituted heterocyclic ring, imidazolyl, indolyl, pyrrolidinyl, $C_1$-$C_{12}$ alkoxy, $C_1$-$C_{12}$ acyl, $C_1$-$C_{12}$ acyloxy, acryloyloxy, nitro, carboxy, protected carboxy, carbamoyl, cyano, methylsulfonylamino, thiol, $C_1$-$C_{10}$ alkylthio and $C_1$-$C_{10}$ alkylsulfonyl. The substituted alkyl groups, aryl groups, alkenyl groups can be substituted once or several times, and preferably 1 or 2 times, with the same or different substituents.

The term "alkynyl", as used here, designates a radical of the formula R—C≡C—, in particular a "$C_2$-$C_6$ alkynyl". Examples for $C_2$-$C_6$ alkynyls include: ethynyl, propynyl, 2-butynyl, 2-pentynyl, 3-pentynyl, 2-hexynyl, 3-hexynyl, 4-hexynyl, vinyl as well as di- and triynes of straight and branched alkyl chains.

The term "aryl", as used herein, designates aromatic hydrocarbons, for example phenyl, benzyl, naphthyl or anthryl. Substituted aryl groups are aryl groups which, as defined above, are substituted with one or more substituents, as defined above.

The term "cycloalkyl" comprises the groups cyclopropyl, cyclobutyl, cyclopentyl, cyclohexyl and cycloheptyl.

In a preferred embodiment, the at least one polycondensation adhesive is a polyamide, a polyester, a silicone and/or a formaldehyde condensate adhesive, in particular a phenol-formaldehyde-resin adhesive (PF), a cresol/resorcinol-formaldehyde-resin adhesive, urea-formaldehye-resin adhesive (UF) and/or melamine-formaldehyde-resin adhesive (MF).

In a further embodiment, the at least one polyaddition adhesive is an epoxy resin, polycyanurate and/or a polyurethane adhesive, in particular a polyurethane adhesive on the basis of polydiphenylmethane diisocyanate (PMDI).

The preferably used particles have a size between 2 and 400 nm, preferably between 2 and 100 nm, particularly preferably between 2 and 50 nm. The particles in particular can be of an oxidic, hydroxidic or oxihydroxidic nature, which can be produced by different methods such as for example ion exchange process, plasma process, sol-gel process, grinding or also flame deposition. In a preferred embodiment, particles on the basis of $SiO_2$, $Al_2O_3$, $ZrO_2$, $TiO_2$, SnO are used.

In a further embodiment, the content of polycondensation adhesive and polyaddition adhesive in the hybrid adhesive is at least 90 wt-%, preferably at least 80 wt-%, particularly preferably at least 70 wt-%. The silane compounds and particles each are used in an amount between 1 and 15 wt-%, preferably between 3 and 13 wt-%, particularly preferably between 5 and 10 wt-% in the hybrid adhesive. The solvent content, which substantially is due to the use of the silanes, likewise lies between 1 and 15 wt-%, preferably between 3 and 13 wt-%, particularly preferably between 5 and 10 wt-%. With these values, however, the solvent content from the used polycondensation and polyaddition adhesives initially is not taken into account.

The adhesive according to the invention is used in the production of wood-based materials, in particular engineered wood boards. The engineered wood boards produced preferably are particle and fiber boards, in particular OSB, LDF, HDF or MDF boards, as well as plywood and glued-laminated timber.

The adhesive according to the invention is produced by a method comprising the following steps:
 a) incorporating at least one particle into a dispersion or suspension of at least one polyaddition adhesive,
 b) addition of at least one first compound of the general Formula (I) and/or (II) and possibly a polymerization starter,
 c) addition of at least one second compound different from the first compound of the general Formula (I) and/or (II),
 d) possibly addition of at least one catalyst, in particular an acid,
 e) mixing the dispersion prepared in step e) with at least one polycondensation adhesive.

The adhesive according to the invention also is produced by a method comprising the following steps:
 a) mixing at least two different compounds of the general Formulae (I) and (II),
 b) addition of at least one particle to the mixture prepared in step a) and possibly addition at least one catalyst, in particular an acid,
 c) addition of at least one polycondensation adhesive, and
 d) final addition of at least one polyaddition adhesive.

As suitable polymerization starters, e.g. dibutylisotin dilaurate, oxazolidine, bisoxazolidine, zinc chloride as well as substance classes of the ketimines or aldimines can be used.

Inorganic and/or organic acids suitable as catalyst are selected from a group including phosphoric acid, acetic acid, p-toluene sulfonic acid, hydrochloric acid, formic acid or sulfuric acid. What is also suitable are ammonium salts such as ammonium sulfate, which react as weak acids.

The particles preferably are used in an amount between 1 and 15 wt-%, preferably between 3 and 13 wt-%, particularly preferably between 5 and 10 wt-%.

The temperatures during the entire production process of the hybrid adhesive usually lie in the range between 20 and 80° C., preferably between 30 and 60° C.

It is also possible to produce the adhesive according to the invention by a method in which initially only precursors of the above-mentioned substances are employed and the nanoscale particles are allowed to grow in solution. For this purpose, an alcoholic solution, e.g. isopropanol, is provided. Subsequently, p-toluene sulfonic acid and a particle material such as e.g. Zr-n-propoxide are added, wherein nanoscale particles are obtained in solution, which subsequently can be modified further.

Corresponding to an exemplary embodiment of the invention, at least one adhesive according to the invention is contained in at least one engineered wood board, in particular a wood particle board and/or wood fiber board, such as e.g. an OSB, LDF, HDF or MDF board. It should be noted that in particular the use of the adhesives PMDI and MUPF in the top layer of OSB boards improves the technological values of the boards such as transverse pull and bending strength and at the same time reduces swelling.

The engineered wood board according to the invention is produced by a method comprising the following steps:
 a) producing wood chips from suitable timber,
 b) chipping the wood chips to wood particles or wood fibers,
 c) temporary storage of the wood particles or wood fibers, in particular in silos or bunkers,
 d) drying the wood particles or wood fibers,
 e) sorting or classifying the wood particles or wood fibers corresponding to the size of the wood particles or wood fibers,
 f) possibly further comminution of the wood particles or wood fibers and temporary storage,
 g) applying the wood particles or wood fibers onto a transport belt by means of pneumatic and/or spreader classification, and
 h) compressing the wood particles or wood fibers arranged on the transport belt, wherein the adhesive according to the invention can be added before, during and/or after one of the steps b) to h). The adhesive thus can be mixed with the wood particles or wood fibers at any time of the production process. It is also imaginable that the adhesive is applied onto the wood particles or wood fibers at several points.

In addition to the method steps listed above, the wood chips are cleaned of foreign substances before their comminution, e.g. in connection with a dry cleaning or wet cleaning.

In a preferred embodiment, the adhesive is sprayed onto the wood particles or wood fibers. The amount of the applied adhesive lies between 2 and 10 wt-% based on the used amount of particles or fibers.

By means of the method according to the invention it is possible to equip particle boards or fiber boards, such as OSB, LDF, MDF or HDF boards with the hybrid adhesive according to the invention.

A typical production method will be described in detail in the following exemplary embodiment with reference to the production of particle boards. The method for producing fiber boards differs from this method for the production of particle boards in particular with regard to the size and quality of the wood fibers or wood particles used as well as with regard to the pressures and temperatures used. The essential procedure and hence the sequence of the method steps however are similar in all boards and known to the skilled person.

BRIEF DESCRIPTION OF THE DRAWINGS

The invention will be explained in detail below by means of several exemplary embodiments with reference to the Figures of the drawings, in which:

FIG. 1 shows a schematic overview of the particle board production by using an adhesive according to the invention.

DETAILED DESCRIPTION

Example 1

Production of a First Hybrid Adhesive

There is provided a urethane matrix in which OH groups and non-bound cyanato groups still are present. $SiO_2$ particles are stirred into the urethane matrix in the desired quantity. Subsequently, the addition of an isocyanatopropyltriethoxysilane and possibly of a starter dibutylisotin dilaurate is effected for the case that a starter is not contained already in the polyurethane. This mixture is heated to 50° C. and maintained at this temperature for about 30 minutes. After cooling to room temperature, a glycidyloxypropyltriethoxysilane and an acid as catalyst, e.g. phosphoric acid, is added and stirred for another 60 minutes. The polyurethane-silane-$SiO_2$ mixture thus prepared subsequently is mixed with a melamine resin matrix.

Example 2

Production of a Second Hybrid Adhesive

There is provided an ethanol/water mixture to which a mixture of glycidyloxypropyltriethoxysilane and tetraethoxysilane is added. Subsequently, the addition of an aqueous silica sol solution, i.e. nanoscale $SiO_2$ particles in water, is effected as well as the addition of an acid, e.g. acetic acid or p-toluene sulfonic acid as catalyst. After a stirring time of 5 minutes, the melamine resin mixture is added and after another stirring time of 20 minutes the polyurethane adhesive.

Example 3

Particle Board Production

Particle shape and particle size have a decisive influence on the quality of particle boards. The middle layer is constructed of larger particles which provide the board with stability, and the top layers (outer layers) should consist of smaller particles, in order to obtain a smooth and regular surface. Depending on the starting material, shape and size of the particles can be influenced better or worse. For producing products of good quality, modern particle board technology therefore always uses a certain amount of fine-grain wood particles for the smooth, uniform top layers as well as mostly chipped fresh or scrap wood with particles of different lengths for the stable, layered structure below the top layer (fresh trunk wood or sawmill waste such as flitches, splinters, scrap wood).

The woodyard is the entry point of the raw material. Here, the different stocks of wood are collected with a receiving inspection (quality, storability of the wood, quantity determination) and assigned to their storage site. The quantity determination can be effected by volume (e.g. stere) or by weight (wet weight, dry weight). Nowadays, it is common practice to determine the dry weight (sampling of the fresh wood, weighing, drying under standardized conditions for 24 h, back-weighing), because here really the used mechanical pulp is evaluated (wood and annual plants contain water).

A well-organized woodyard is the first prerequisite for boards of good quality, as the used raw material defines the basic properties: only healthy wood particles, i.e. no too old, rotten wood; permanently good intermixture of coniferous, deciduous as well as annual plants, which is decisive for the compression and weight of the boards; combination of the used stocks of wood, such as sawdust, fresh trunk wood, sawmill waste, scrap wood, which substantially influence the physical properties. In exceptional cases, annual plants such as flax, straw, hemp also can be mixed into the top layer and middle layer or completely be made therefrom.

Accordingly, it is the object of the woodyard to introduce the stored wood and annual plants into the production (registration of the wood batches according to storability, mechandise sales plan, accessibility of each storage site) and to be able to permanently ensure intermixing of the types and stocks of wood.

The steps of the particle board production described below are schematically illustrated in FIG. 1.

Chipping:

In the first working step wood particles can be produced, which subsequently are chipped or chipping is effected directly from the industrial wood, scrap wood or annual plants. Depending on the desired particle shape, different chippers can be employed. Typical chipping machines are knife ring chippers or knife shaft chippers.

After chipping, temporary storage in silos or bunkers is effected; since the raw material still is moist, this zone is called wet silo.

Drying:

The particles are blown through the particle drier and dried with process heat (petroleum, natural gas, used wood, etc.) to about 1-4% of wood moisture.

Classifying:

Classifying is effected by using sieves of different hole sizes. Possibly, this is followed by a post-comminution. During the classification, the fractions are adjusted for middle layer (coarse particles) and top layer (fine particles). Microfractions such as wood dust are thermally utilized as energy sources (e.g. for drying, instead of petroleum), since the same would not contribute to an improvement of the board quality and only would bind much glue. Coarse fractions are post-comminuted. Additionally, a gravimetric classification frequently is effected during the pneumatic classification.

Filling:

The mat is prepared by mechanical and air-stream-based machines, which also are able to again perform a separation of the particles.

Pressing:

Pressing is effected in single- or multi-platen presses and in clocked or continuous (endless) systems. Flat pressing or strand methods likewise are commonly used methods.

Cooling/Calibrating:

Subsequent to pressing, the boards are cooled in the star cooler. The cooled, dimensionally stable boards are calibrated to the exact thickness by grinding the surfaces.

Finishing:

The further processing to decorative boards is effected e.g. by applying decorative papers impregnated with melamine resin or by painting and their derived products such as laminate flooring.

Assembly:

The plant provides for an automatic cutting waste optimization, so that the large-format boards are cut to the desired small formats with minimum scrap. The scrap can be recirculated into the production.

At various points of the production method, the hybrid adhesive of the present invention is mixed with the wood material or applied onto the same (see FIG. 1). Gluing or the application of the hybrid adhesive is effected after chipping, before the temporary storage in a silo or bunker, after the temporary storage in a silo or bunker, before drying, after drying, before the classification, after the classification, during the classification, before the post-comminution, after the post-comminution, during the post-comminution, after the classification of individual fractions, before the intermediate bunker, after the intermediate bunker, before the mixer, in the mixer, after the mixer, in feed chutes, Blowline/SIS, during the conveyance of the middle or top layer, before the scattering or filling process, during the scattering or filling process and/or after the scattering or filling process.

The invention claimed is:

1. A hybrid adhesive, for use in the production of wood-based materials, comprising
at least one polycondensation adhesive being a polyamide, a polyester, and/or a formaldehyde condensate adhesive,
at least one polyaddition adhesive being polycyanurate, and/or polyurethane adhesive, and
at least one oxidic, hydroxidic or oxihydroxidic nanoparticle with a size between 2 and 100 nm,
wherein the at least one nanoparticle is a $SiO_2$-based nanoparticle, which is used in the hybrid adhesive in an amount between 1 and 15 wt %;
wherein the at least one nanoparticle is modified with at least one compound of the general Formula (I)

$$R_a SiX_{(4-a)} \quad (I),$$

or the general Formula (II)

$$O_b X_c (OH)_d R_e SiO_{(4-b-c-d-e)/2} \quad (II),$$

wherein X is H, OH or a hydrolyzable radical selected from the group consisting of halogen, alkoxy, carboxy, amino, monoalkylamino or dialkylamino, aryloxy, acyloxy, and alkylcarbonyl,
wherein R is a non-hydrolyzable organic radical R selected from the group consisting of substituted and non-substituted alkyl, substituted and non-substituted aryl, substituted and non-substituted alkenyl, substituted and non-substituted alkynyl, substituted and non-substituted cycloalkyl, and combination thereof, which can be interrupted by —O—,
wherein R includes at least one functional group Q which is selected from the group consisting of epoxy, hydroxy, ether, carboxy, alkynyl, acrylic, acryloxy, methacrylic, methacryloxy, mercapto, cyano, alkoxy, isocyanato, aldehyde, alkylcarbonyl, acid anhydride and phosphoric acid group, and
wherein the substituent(s) for the substituted alkyl R are selected from the group consisting of epoxy, hydroxy, ether, carboxy, alkynyl, acrylic, acryloxy, methacrylic, methacryloxy, mercapto, cyano, alkoxy, isocyanato, aldehyde, alkylcarbonyl, acid anhydride, phosphoric acid group, and combinations thereof,
R and X each can be the same or different from each other, and
a=1, 2, 3,
b, c, d=0 or 1, and
e=1, 2, 3.

2. The adhesive according to claim 1, wherein X is selected from the group consisting of fluorine, chlorine, bromine, iodine, $C_{1-6}$ alkoxy, methoxy, ethoxy, n-propoxy, butoxy, $C_{6-10}$ aryloxy, phenoxy, $C_{2-7}$ acyloxy, acetoxy, propionoxy, $C_{2-7}$ alkylcarbonyl, and acetyl.

3. The adhesive according to claim 1, wherein R is selected from the group consisting of substituted and non-substituted $C_1$-$C_{30}$ alkyl, substituted and non-substituted $C_5$-$C_{25}$ alkyl, substituted and non-substituted $C_2$-$C_6$ alkenyl, substituted and non-substituted $C_2$-$C_6$ alkynyl, and substituted and non-substituted $C_6$-$C_{10}$ aryl.

4. The adhesive according to claim 1, wherein R is selected from the group consisting of methyl, ethyl, n-propyl, isopropyl, n-butyl, s-butyl, t-butyl, pentyl, hexyl, cyclohexyl, vinyl, 1-propenyl, 2-propenyl, butenyl, acetylenyl, propargyl, phenyl and naphthyl.

5. The adhesive according to claim 1, wherein the functional group Q is an epoxide, a glycidyl, a glycidyloxy or an isocyanato group.

6. The adhesive according to claim 1, wherein the at least one polycondensation adhesive is a phenol-formaldehyde-resin adhesive (PF), a cresol/resorcinol-formaldehyde-resin adhesive, urea-formaldehyde-resin adhesive (UF) and/or melamine-formaldehyde-resin adhesive (MF).

7. The adhesive according to claim 1, wherein the at least one polyaddition adhesive is a polyurethane adhesive on the basis of polydiphenylmethane diisocyanate (PMDI).

8. The adhesive according to claim 1, wherein the at least one nanoparticle has a size between 2 and 50 nm.

9. A method for the production of an adhesive according to claim 1, comprising the following steps:
a) incorporating at least one nanoparticle into a dispersion or suspension of at least one polyaddition adhesive,
b) addition of at least one first compound of the general Formula (I) and/or (II) and possibly a polymerization starter,
c) addition of at least one second compound different from the first compound of the general Formula (I) and/or (II),
d) optionally addition of at least one catalyst, in particular an acid, and
e) mixing the dispersion prepared in step c) or d) with at least one polycondensation adhesive.

10. A method for the production of an adhesive according to claim 1, comprising the following steps:
a) mixing at least two different compounds of the general Formulae (I) and (II),
b) addition of at least one nanoparticle to the mixture prepared in step a) and optionally addition at least one catalyst, in particular an acid,
c) addition of at least one polycondensation adhesive, and
d) final addition of at least one polyaddition adhesive.

11. An engineered wood board, in particular a wood particle board and/or wood fiber board, comprising at least one adhesive according to claim 1.

12. A method for the production of an engineered wood board according to claim 11, comprising the following steps:
a) producing wood chips from suitable timber,
b) chipping the wood chips to wood particles or wood fibers,
c) temporary storage of the wood particles or wood fibers, in particular in silos or bunkers,
d) drying the wood particles or wood fibers,
e) sorting or classifying the wood particles or wood fibers corresponding to the size of the wood particles or wood fibers,
f) possibly further comminution of the wood particles or wood fibers,
g) applying the wood particles or wood fibers onto a transport belt by means of pneumatic and/or spreader classification,
h) compressing the wood particles or wood fibers arranged on the transport belt,
wherein at least one adhesive according to claim 1 can be added before, during and/or after any of the steps b) to h).

13. The method according to claim 12, wherein the adhesive is sprayed onto the wood particles or wood fibers.

14. A method of adhering wood based materials comprising applying the adhesive of claim 1 to a wood based material.

15. A method according to claim 14, wherein the adhesive is applied to the wood based material to prepare an engineered wood board.

* * * * *